United States Patent Office 3,517,047
Patented June 23, 1970

3,517,047
LINEAR ALIPHATIC ω-CYANOALDEHYDES AND
PREPARATION THEREOF
Masaji Ohno and Norio Naruse, Kamakura-shi, Japan,
assignors to Toyo Rayon Kabushiki Kaisha, Tokyo,
Japan, a corporation of Japan
No Drawing. Filed Apr. 11, 1966, Ser. No. 541,534
Claims priority, application Japan, June 3, 1965,
40/32,447; Sept. 24, 1965, 40/58,069; Sept. 30,
1965, 40/59,462
Int. Cl. C07c 87/04, 121/34, 131/00
U.S. Cl. 260—465.9      4 Claims

ABSTRACT OF THE DISCLOSURE

Linear ω-cyanoaldehydes of the general formula NC—R—CHO wherein R is a straight chain saturated hydrocarbon of 4–10 carbon atoms; or R is a decadienyl radical; and a process for the preparation of aliphatic linear ω-cyanoaldehydes of the general formula NC—R'—CHO which comprises reacting five to twelve-membered alicyclic α-substituted oximes of the general formula

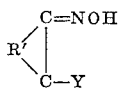

wherein R' is a straight chain saturated hydrocarbon radical from 3–10 carbon atoms, or decadienyl radical; and Y is a substituent selected from the group consisting of alkoxy and amino groups with a phosphorus halide or a sulfur halide so as to cause ring cleavage.

---

This invention relates to novel and useful aliphatic ω-cyanoaldehydes represented by the general formula

NC—R—CHO (wherein R represents a straight chain hydrocarbon radical of 3–10 carbon atoms) and the process for preparation of the same as well as their intermediates.

Industrial production methods of making aliphatic linear α-cyanoaldehydes has not been the subject of systematic investigations and research in the past, and no noteworthy proposal in that field has been made.

On the other hand, Beckmann rearrangement of compounds having a substituent in the α-position of aliphatic, monocyclic oximes was studied to some extent when the substituent was an alkyl radical or a halogen atom. However the direction of the rearrangement and the product vary widely depending on the specific rearranging agent and the reaction conditions employed, and therefore the results cannot be readily predicted. Again since introduction of various substituents into the α-position of alicyclic oximes has been regarded as very difficult from the standpoint of technical synthesis, such studies as the application of Beckman rearrangement to those compounds have been made only in very limited scope.

We took note of the facts that α-substituted oximes are not of much use as they are, and that alicyclic α-chlorooximes can be readily obtained in high yields by the reactions of cycloolefins with nitrosyl chloride, and carried out research to derive novel and useful compounds from alicyclic α-chlorooximes, and successfully developed the novel aliphatic linear ω-cyanoaldehydes of the foregoing general formula, which are valuable as polymer intermediates.

Accordingly, the object of this invention is to provide novel and useful aliphatic linear ω-cyanoaldehydes.

The second object of the invention is to provide industrial processes for preparing such novel compounds with industrial advantage and efficiency, as well as the processes for preparing intermediates useful as the reactants for said processes with advantage and efficiency.

For easier understanding, the course of production of the novel compounds of the invention will be illustrated with general formulae as follows:

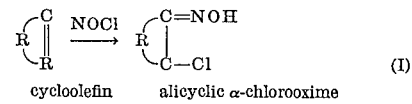    (I)

cycloolefin    alicyclic α-chlorooxime (in which R has the foregoing significance)

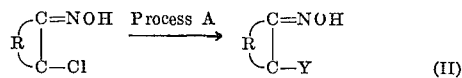    (II)

(in which Y is —OR', —SR' or —NR''R'', R' being an alkyl and R'' being independently selected from the group consisting of hydrogen and an organic residue)

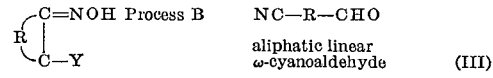    (III)

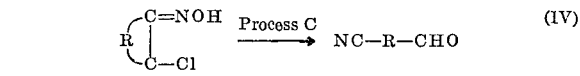    (IV)

The novel aliphatic linear ω-cyanoaldehydes of the invention can be obtained from alicyclic α-alkoxyoximes, alicyclic α-aminooximes or alicyclic α-(alkylthio) oximes which are the products of a Process A of the above Formula II, by means of a Process B as in the Formula III. They can also be obtained from alicyclic α-chlorooximes by means of a Process C as in the Formula IV.

Each of the processes will be explained in detail hereinbelow.

Process A

Alicyclic α-alkoxyoximes in which Y is —OR', referring to the Formula II, can be obtained by reacting alicyclic α-chloro oximes, in the presence of a basic substance selected from the group consisting of inorganic bases, organic bases and metal alkoxides with alcohols or with the said metal alkoxides.

Process A–1

Alicyclic α-chlorooximes used in this invention may be any aliphatic monocyclic oximes which have a chlorine atom in the α-position. Its alicyclic portion may be saturated or unsaturated, and its oxime group may be free or in the form of hydrochloride or other addition salt.

Thus the term "alicyclic α-chloroximes," as used in this specification, includes all of the compounds as described above.

Such alicyclic α-chlorooximes can be readily obtained by the accepted practice of reacting the corresponding cycloolefin with NOCl as shown in the Formula I. If the reaction is conducted in the presence of hydrochloric acid, the product can be obtained in the form of hydrochloric acid addition salt.

As examples of specific alicyclic α-chlorooximes used in the invention, the following may be named: α-chlorocyclohexanone oxime, α-chlorocyclooctanone oxime, α-chlorocyclooctenone oxime or 2-chlorocyclooctene-5-one oxime, α-chlorocyclodecanone oxime and α-chlorocyclododecadienone oxime or 2-chlorocyclododecadiene-5,9-one oxime.

In Process A–1, presence of an inorganic base, organic base or a metal alkoxide as a basic substance in the reaction system is essential, while the use of an organic base or a metal alkoxide gives a more satisfactory results This is to a large extent due to the solubility of the metal alkoxide, besides its remarkable alkoxylating action.

Although it is particularly desirable at the alkoxylation stage of Process A–1 that the reaction system should be substantially anhydrous in order to prevent the unfavorable hydrolysis of the oxime group, when a normal inorganic base is used, a homogeneous solution is generally hard to obtain in such substantially anhydrous system.

According to our research, the main reaction at the alkoxylation stage of Process A–1 is not based on the mere substitution of the chlorine in the α-position of alicyclic α-chlorooximes by an alkoxy group, but first dehydrochlorination takes place to form an α,β-unsaturated nitrosocompound which is subsequently converted into an alkoxylated oxime through the Michael condensation.

In other words, in Process A–1 theoretically the reaction which requires one equivalent of base to alicyclic α-chlorooximes takes place to form an intermeidate. Therefore, the amount of the base to be present in the reaction system in practice is determined in consideration of such a stoichiometric relationship. In order to obtain a practical yield, it is desirable that throughout the entire reaction procedure more than 1 equivalent, at least more than 1.5 equivalents, of base should be used. Particularly the use of 2–3 equivalents brings about optimum result. The upper limit is about 10 equivalents, and the use of a larger amount is objectionable because it causes heavy coloration of the product.

As the basic substance usable in Process A–1, the following may be named for example: inorganic bases such as alkali metal hydroxide, sulfites of and hydroxides of alkaline earth metal; organic bases such as diethylamine, triethylamine and pyridine; and alkali metal alkoxides obtained from an alcohol such as methyl alcohol, ethyl alcohol, propyl alcohol, butyl alcohol, hexyl alcohol, benzyl alcohol, etc. and an alkali metal such as sodium, potassium, etc.

When a considerable amount of metal alkoxide is used as the basic substance, the presence of alcohol in the reaction system is not necessarily required. Whereas, when inorganic or organic base is used, the presence of alcohol as the source to supply the alkoxy group is necessary. In case organic base is used, its amount is of high significance, 1–3 mol equivalents thereof to α-chlorooxime being preferred. Its use in a larger amount than the preferred range causes formation of α-aminooxime as the side product. Therefore, the amount of alcohol used as the solvent in that case must be in such large excess to α-chlorooximes such as at least more than 10 mol equivalents. Alcohols is used in large excess of the normal theoretical quantity because the alcohol has a remarkable effect as the reaction medium.

The reaction temperature differs depending on specific starting material and other conditions, but normally the range of −30 to 130° C. is employed.

As aforesaid, the reaction medium is normally the alcohol corresponding to R′ of the —OR′ substituent, regardless of the type of basic substance used. Of course it is also possible to use an inert solvent such as dimethylsulfoxide, dimethylformamide, etc.

Thus, when metal alkoxide or inorganic base is used, one obtains the alkali metal salt of the oxime in which the α-chlorine has been replaced with an alkoxy group. And, when a proton-type substance such as alcohol is present in the reaction system, the salt is immediately converted into free oxime, i.e. alicycli α-alkoxyoxime. However when the reaction is performed in the absence of a proton-type substance, the product retains the form of the alkali salt and conversion of the same to free oxime becomes necessary. Such conversion can be achieved simply by an aqueous treatment, and therefore normal extraction or other post-treatment using water is sufficient.

Process A–1 has many characteristic advantages including the obtaining of alicyclic α-alkoxyoxime from alicyclic α-chlorooxime in a high yield, the formation of ketone derivatives due to hydrolysis of unstable oxime group can be inhibited substantially so as to maintain said hydrolysis to a negligible level, and that the formation of unsaturated oxime due to dehydrochlorination can be completely inhibited.

Again the alicyclic α-aminooximes in which Y is —NR″R‴ referring to the Formula II, can be obtained by reacting alicyclic α-chlorooximes with a metal salt of carboxylic acid to form alicyclic α-acyloxyoximes (Process A–2a), and further reacting the said alicyclic α-acyloxyoxime with ammonia or an amine the nitrogen of which is bonded with at least one hydrogen atom (Process A–2b). Or, alternatively, it may be obtained by directly reacting alicyclic α-chlorooximes with ammonia or an amine the nitrogen of which is bonded with at least one hydrogen atom in a non-proton type solvent (Process A–2c).

To wit, in Process A–2, alicyclic α-aminooximes are obtained through Process A–2a, A–2b and A–2c. In Process A–2a, first alicyclic α-chlorooximes similar to that used in Process A–1 are reacted with a metal salt of carboxylic acid. The organic carboxylic acid portion forming the said salt may be aliphatic or aromatic. Suitable organic carboxylic acids include formic, acetic, propionic, benzoic, phthalic and adipic acids, etc. Specific carboxylic acids may be freely selected according to the type of acyloxy radical desired on the oxime to be obtained in Process A–2. The type of metal is not particularly limited, but normal alkali metals such as sodium, potassium, etc. are preferred for the easy handling and economy. The theoretical amount of such metallic carboxylate required is 1 mol equivalent (in case a monovalent metal salt is used) to alicyclic α-chlorooxime, but in light of considerations of purity of the product and the reaction rate, normally an excess such as 1–10 mol equivalent thereof to alicyclic α-chlorooximes is preferably employed.

As the reaction medium, organic solvents such as acetone, tetrahydrofuran, dimethylsulfoxide, dimethylformamide, ether, benzene, hexane, etc. can be used, inter alia, oxygen-containing polar organic solvents such as acetone and tetrahydrofuran being particularly effective.

The reaction temperature differs depending on variable conditions such as specific type of the starting material, but normally the range of −30 to 130° C. is preferably used. Incidentally, it is desirable that the reaction system should be kept anhydrous to the maximum possible extent.

In Process A–2a, dehydrochlorination takes place at the intermediate stage to first form α,β-unsaturated nitroso compound which is subsequently acyloxylated through a Michael-type reaction. Accordingly, the process has excellent characteristics such that alicyclic α-acyloxyoximes are thereby obtained in very high yields. Such effects are attributable in part to the use of a compound, in which chlorine and oxime groups are vicinal, as the starting material.

The said α,β-unsaturated nitroso compounds formed as intermediates can be produced by ordinary treatment with inorganic bases or metal alkoxides other than by Process A–2a, but in the former case a homogeneous phase is generally hard to obtain because of low solubility. Particularly with respect to the subject reaction system in which the presence of water is prohibited to prevent hydrolysis of oxime, such inorganic base treatment has little practical value. The metal alkoxide treatment also has a drawback in that the side-product alcohol, enters into side reactions. In contrast, in Process A–2a the formation of α,β-unsaturated nitroso compounds and α-acyloxyoximes take place in the same reaction system, without any drawback inherent in either of the foregoing conventional treatments.

Furthermore Process A–2a has such excellent characteristics that the formation of ketone derivatives due to hydrolysis of unstable oxime groups can be inhibited substantially and the formation of unsaturated oximes due to dehydrochlorination can be completely inhibited.

The alicyclic α-acyloxyoximes obtained in Process A–2a are converted to alicyclic α-aminooximes by Process A–2b. At this stage, the oxime group of said oxime may be free or in the form of hydrochloride or other addition salt. Usable alicyclic α-acyloxyoximes, include, for example, α-acyloxycylohexanone oxime, α-acyloxycyclooctanone oxime, α-acyloxycylododecadienone oxime, α-acyloxycylododecanone oxime, etc. Furthermore, as the acyloxy radical in the α-position, any radical within the scope of —OCOR (in which R is H or an organic residue) such as acetoxy, formyloxy, benzoyloxy, etc. can be used.

Again as the amines, the nitrogen of which is bonded with at least one hydrogen atom which are to be reacted with the α-acyloxyoximes include ammonia, primary and secondary organic amines such as butylamine, aniline, morpholine, piperidine and pyrrolidine, and preferably the organic amines of not over 6 carbon atoms, and inorganic amines such as hydroxylamine and hydrazine.

Accordingly, the term "alicyclic α-aminooximes" in which Y stands for —NR″R″ referring to Formula II, includes, besides those in which R″ is R, those compounds in which at least one hydrogen of the —NH₂ group is substituted by an organic residue, as for example,

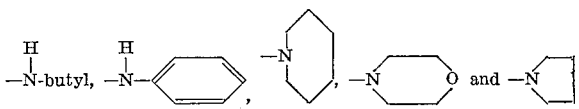

in which N is part of a heterocyclic ring.

The amount of ammonia or such amine to be used is theoretically 2 mol equivalents per alicyclic α-acyloxyoxime, but in practice 2–10 mol equivalents are used with advantage in regard to purity of the product and the rate of reaction. This system is applicable to Process A–2c in entirely the same manner. That is, when α-chlorooximes are directly reacted with an amine, the reaction medium should be a non-proton type solvent. The amines and the solvents can be those which are used in the foregoing process for obtaining α-aminooximes from α-acyloxyoximes.

As the reaction medium, organic solvents such as tetrahydrofuran, ether, dimethylsulfoxide, dimethylformamide, benzene, etc. may be used, polar solvent such as dimethylsulfoxide being particularly effective.

The reaction temperature differs depending on other conditions such as the specific starting material employed, but normally the range of 0–130° C. is preferably used. It is again desirable that the reaction system should be kept anhydrous to the maximum possible extent.

Thus alicyclic α-aminooxime derivatives are obtained in high yields. The prominent characteristics of Process A–2b are that the alkyl-oxygen fission of the ester group takes place and the ester groups are displaced by ammonia or amines. Furthermore, according to these processes not only are alicyclic α-aminooximes obtained in high yields, but additionally the formation of ketone derivatives due to hydrolysis of unstable oxime groups is substantially avoided and the formation of unsaturated oximes by elimination of carboxylic acid is completely inhibited.

Alicyclic α-(alkylthio) oximes in which Y is —SR', referring to Formula II, are obtained by reacting the alicyclic α-chlorooximes as specified in Process A–1 with alkane thiol or metal alkane thiolate in the presence of substantially no less than 1 equivalent to the amount of metal alkane thiolate of the oxime (Process A–3).

In Process A–3, regardless of the type of reagents employed to introduce alkylthio groups into the product, the presence of theoretically 1 equivalent of metal alkane thiolate to the alicyclic α-chlorooxime in the reaction system is essential. This supports the fact that the effect of the Process A–3 which results in the formation of the desired product in high yields within a short time is due to the fact that its reaction route is essentially different from that in which mere substitution is the main reaction. In fact we found the main reaction to be first the metal alkane thiolate causing dehydrochlorination of alicyclic α-chlorooximes to form α,β-unsaturated nitroso compounds which are subsequently thioalkylated through successive Michael-type reaction by the thioalkylating reagent concurrently present in the reaction system. Thus the prominent characteristic of Process A–3 is the presence of α,β-unsaturated nitroso compound formed at the intermediate stage.

In Process A–3, when the metal alkanethiolate is present in the reaction system in an amount substantially greater than 1 equivalent per mole of the alicyclic α-chlorooximes, the excess metal alkanethiolate functions as thioalkylating reagent to form alicyclic α-(alkylthio) oximes. Therefore, it is normally preferred to use at least 2 equivalents of metal alkanethiolate per equivalent of alicyclic α-chlorooxime. In practice the amount of metal alkanethiolate present in the system is preferably not more than 10 equivalents to alicyclic α-chlorooxime because the use of a larger amount causes heavy coloration of the product. Normally 2–3 equivalents of the alkylating agent to alicyclic α-chlorooxime is employed. As such metal alkanethiolates alkali metal alkanethiolates obtained from the reaction of alkane thiols with alkali metals are preferred. Normally a metal alkanethiolate is used as the thioalkylating reagent, but an alkanethiol may also be used. That is, when the amount of metal alkane thiolate present in the reaction system is not sufficient to complete the thioalkylating reaction, the deficiency may be supplemented with alkanethiol.

As the reaction medium, alkane thiol itself or inert solvent such as dioxane, tetrahydrofuran, ethylether, etc. may be suitably used.

The reaction temperature may range from —20 to 80° C. the range of 0–50° C. being particularly preferred.

The thus formed alicyclic α-(alkylthio) oxime is normally obtained as a salt, but when a proton-type substance is present in the reaction system, the product is immediately converted to free oxime. On the other hand, the oxime salt obtained in the absence of a proton-type substance can be easily converted to free oxime with an aqueous treatment.

In Process A–3 as above, the starting material must be a compound in which the oxime radical and chlorine are vicinal, i.e., alicyclic α-chlorooximes, because at the intermediate stage of the reaction α,β-unsaturated nitroso compounds are formed. The process has many characteristic advantages in that, besides high yields, the formation of ketone derivatives due to hydrolysis of unstable oxime groups can be inhibited substantially and that the formation of unsaturated oxime due to dehydrochlorination can be completely inhibited.

Those alicyclic α-alkoxyoximes, alicyclic α-aminooximes and alicyclic α(alkylthio) oximes obtained by Process A (Process A–1, Process A–2a, A–2b, A–2c of Process C) can be converted to the object aliphatic linear ω-cyanoaldehydes by Process B (Processes B–1, B–2, B–3, B–4 or B–5) as shown in the Formula III. Process B will be explained hereinbelow.

Aliphatic linear ω-cyanoaldehydes can be obtained by reacting alicyclic α-alkoxyoximes with hydrogen chloride in the presence of alcohol, and contacting the reaction product with water (Process B–1).

Process B–1 can be shown by general formulae as below.

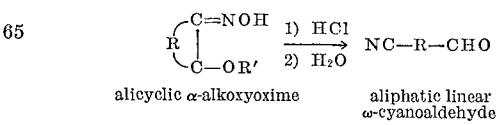

alicyclic α-alkoxyoxime    aliphatic linear ω-cyanoaldehyde in which R stands for a divalent radical forming alicyclic portion, and OR' stands for alkoxy radical.

The alicyclic portion of the oxime is 5–12-membered ring. Such alicyclic portion is not limited to a saturated ring, but may suitably include unsaturated bonds, or may be substituted with a group inert to the subject reaction such as an alkyl group. As such compounds, for example, α-alkoxycyclopentanone oxime, α-alkoxycyclohexanone oxime, α-alkoxycyclooctanone oxime, α-alkoxycyclododecanone oxime, α-alkoxycyclooctenone oxime, α-alkoxycyclododecandienone oximes, etc. may be named. The alkoxy group in the α-position of these compounds is not limited from the standpoint of the essential nature of the reaction, but considering economy the alkoxy groups of no more than 6 carbon atoms such as methoxy, ethoxy, propoxy, butoxy and phenoxy, and especially methoxy and ethoxy groups, are preferred. The oxime group of such alicyclic α-alkoxyoxime may be in the form of an addition salt, such as hydrochloride.

Again the alcohol used as the reaction medium may be any compound having an alcoholic hydroxyl group, but from the standpoint of economy aliphatic alcohols of no more than 6 carbon atoms, inter alia methanol and ethanol, are preferred.

The amount of hydrogen chloride employed is normally 0.5–5 mols per mol of the alicyclic α-alkoxyoxime, 1 mol being particularly preferred.

The reaction temperature is normally higher than 50° C., i.e., the range of 80–100 C. being particularly preferred. Further, the system should be kept anhydrous to the maximum possible extent to inhibit side reactions such as hydrolysis.

After this treatment with hydrogen chloride-containing alcohol, by simply contacting the reaction product with water, the object ω-cyanoaldehydes can be readily obtained.

Alicyclic α-alkoxyoximes again may be converted to aliphatic linear-cyanoaldehydes by the following means. To wit, the object product may be obtained by reacting alicyclic α-alkoxyoximes with halogen and tertiary phosphine and thereafter contacting the product with water (Process B–2). This may be illustrated with general formulae as follows:

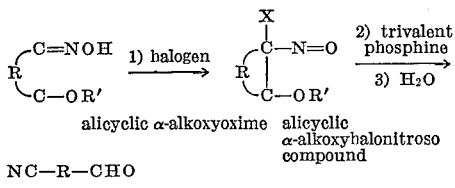

NC—R—CHO aliphatic linear ω-cyanoaldehyde in which R stands for a divalent organic residue forming the alicyclic portion and —OR' stands for an alkoxy radical. X stands for halogen.

The alicyclic α-alkoxyoximes used as the starting materials in this process are similar to those described in Process B–1. Particularly those of cyclopentane structure, cyclohexane structure, cyclooctane structure and cyclododecane structure are preferred, but those of, for example, cyclooctene structure and cyclododecadiene structure may also be used.

The phosphorus compound used in Process B–2 essentially may be any trivalent organic phosphorus compound, but for ease of handling tertiary phosphines such as trimethylphosphine, triethylphosphine, tributylphosphine, triphenylphosphine, methyldiphenylphosphine, etc., are used in the subject process.

The amount of such organic phosphorus compound to be used is about 1–2 mol equivalents per mol of alicyclic α-alkoxyoximes.

As the halogen, chlorine, bromine and iodine are preferred and are normally used in excess of one mole equivalent to alicyclic α-alkoxyoxime. Such halogen may be directly added to the reaction system or may be dissolved in a suitable organic solvent in advance of the addition. Whereas, with chlorine, introduction thereof in gaseous form often gives a more satisfactory result.

Process B–2 is characterized by the treatment of alicyclic α-alkoxyoximes with halogen and phosphorus compounds, in which first the halogen participates in the reaction to form alicyclic α-alkoxyhalonitroso compounds the rings of which are subsequently opened by the phosphorus compounds. Therefore, it is also possible to contact alicyclic α-alkoxyoximes with halogen in advance to form the alicyclic α-alkoxyhalonitroso compound, and thereafter to add phosphorus compounds thereto.

In practicing the subject process, the presence of a reaction medium is desirable. As the medium, inert organic solvents such as ether, tetrahydrofuran, benzene and toluene are preferred. The optimum reaction temperature differs depending on the type of reaction medium employed as well as other conditions, but it normally ranges from 0 to 100° C., and particularly around room temperature is preferred.

The reaction time naturally varies depending on the scale of the reaction and other conditions, but it can easily be determined in each individual case by noting such phenomenon are termination of heat generation from the reaction system or disappearance of the blue color characteristic of the alicyclic α-alkoxyhalonitroso compounds. By contacting the thus obtained reaction product with water by such means as adding water to the system, the object aliphatic linear ω-cyanoaldehydes can be readily obtained.

There is still other means to produce the object product using a similar starting material as described in Processes B–1 and B–2. To wit, the object product can be obtained by reacting alicyclic α-alkoxyoximes with phosphorus halide or sulfur halide to bring about the ring cleavage (Process B–3).

The phosphorus halides or sulfur halides used as the rearranging reagents are compounds wherein the molecule has a phosphorus or sulfur atom and halogen atoms. As such, phosphorus pentachloride, phosphorus trichloride, phosphorus pentabromide, phosphorus tribromide and thionyl chloride, etc. are particularly preferred. The amount of the rearranging agents used is normally no less than 1 mol equivalent to alicyclic α-alkoxyoxime, e.g., 1.3 mol equivalents.

The reaction temperature is normally from −30 to 80° C., particularly from −10 to 30° C., while the temperature should be carefully controlled because the subject reaction is exothermic and the rapid temperature rise tends to cause the product to be colored or become tarry. Particularly when the rearranging reagents are in large excess or the reaction temperature is too high, side reactions in which the nitrile radical of the object ω-cyanoaldehydes is converted to amide radicals by hydrolysis or oxidation of the aldehyde radical to the carboxyl radicals tend to take place.

As the reaction medium, any organic solvent which is inert to the rearranging agent can be used, normally ether-type solvents such as ethyl ether, tetrahydrofuran, dioxane, etc. are preferred.

This Process B–3 has such advantages that the reaction stages are few and that the reaction conditions are very mild.

Again, this process can be applied to unsaturated alicyclic α-alkoxyoximes such as α-alkoxycyclododecadienone oximes to produce the corresponding unsaturated aliphatic ω-cyanoaldehydes. A ring cleavage similar to the case of saturated compounds takes place while retaining the unsaturated bond. Again treatment of the alicyclic α-alkoxyoximes which are the starting materials of Process B–3 with sulfuric acid, hydrochloric acid or polyphosphoric acid, affords no appreciable amount of aliphatic linear ω-cyanoaldehydes.

Further according to this invention, such alicyclic α-aminooximes as obtained through Processes A–2a, A–2b, A–2c can be used to similarly produce aliphatic linear ω-cyanoaldehydes. To wit, by reacting alicyclic α-aminooximes with phosphorus halides or sulfur halides or acetic anhydride to cause ring cleavage (Process B–4), the object product can be obtained.

The alicyclic α-aminooximes are those compounds which have an amino group at the position adjacent to the oxime group of the alicyclic oximes, and the alicyclic portion may be saturated or unsaturated. The oxime may be free or in the form of addition salt such as hydrochloride, but the free state is preferred.

The amino group in the α-position is preferably one in which the number of hydrogen atoms bonded with nitrogen is no more than one, i.e., in which at least one hydrogen of —$NH_2$ is substituted by a radical other than hydrogen. As such substituent groups, for example, hydroxyl groups, monovalent or divalent aliphatic groups and aromatic groups may be named. Specific examples of such compounds may be given as follows: α-morpholinocyclohexanone oxime, α-piperidinocyclohexanone oxime, α-(n-butylamino) cyclohexanone oxime, α-anilinocyclohexanone oxime, α-morpholinocyclo-octanone oxime, α-pyrrolidinocyclooctanone oxime, α-piperidinocyclooctanone oxime, α-(n-butylamino)-cyclooctanone oxime, α-anilinocyclo-octanone oxime, α-morpholinocyclododecanone oxime, α-morpholinocyclooctenone oxime, α-morpholinocyclododecadienone oxime, etc.

The rearranging reagents to be used in Process B–4 are similar to the halides described in Process B–3.

The preferred reaction conditions in using the rearranging reagents differ somewhat depending on the activity of the specific reagents, solvent effects, etc. To wit, when phosphorus halides or sulfur halides are used as the rearranging reagent, no less than 1 mol equivalent thereof to mol of alicyclic α-aminooximes, particularly 1–3 mol equivalents, is employed. The reaction temperature normally ranges from —30 to 80° C., particularly the range of —10 to —30° C. being preferred. Furthermore the subject reaction being exothermic, the product tends to be colored or become tarry due to rapid temperature rise. Therefore the temperature should be very carefully controlled.

As the reaction medium, while any organic solvent which is inert to the rearranging reagents may be used, ether type solvents such as ethylether, tetrahydrofuran and dioxane are preferred.

On the other hand when acetic anhydride is used as the rearranging agent, it is used in an amount normally no less than 1 mol equivalent to alicyclic α-aminooximes, particularly the range of 2–20 equivalents being preferred. The reaction temperature ranges normally from —30 to 140° C., preferably from 17 to 120° C. Generally it is sufficient to conduct the reaction at a temperature above the melting point and below the boiling point of the rearranging reagents or of the reaction medium, with no special care for its control being required. While the reaction medium is not particularly required, any organic solvent which is inert to the rearranging reagents may be used. Normally acetic acid is used with preference.

This Process B–4 whereby aliphatic ω-cyanoaldehydes are obtained in high yields has further such advantages that the reaction stages are few in number and the reaction conditions are mild.

Process B–4 is furthermore characterized by the fact that when it is applied to unsaturated α-aminooxime derivatives such as α-morpholinocyclododecadienone oximes, ring cleavage takes place in a manner similar to the case of saturated compounds, while retaining the unsaturated bond, and the corresponding unsaturated aliphatic ω-cyanoaldehydes are obtained.

Again by reacting such alicyclic α-(alkylthio) oximes as obtained from Process A–3 with phosphorus halide to cause ring cleavage, similarly aliphatic linear ω-cyanoaldehydes can be obtained (Process B–5).

The alicyclic portion of the alicyclic ω-(alkylthio) oximes used in the Process B–5 may be saturated or unsaturated. Again the oxime group may be in the free form or in the form of addition salt such as hydrochloride, the free form being preferred. As such alicyclic α-(alkylthio) oximes, specifically α-(alkylthio) cyclohexanone oxime, α-(alkylthio)cyclooctanone oxime, α-(alkylthio) cyclododecanone oxime and α-(alkylthio) cyclododecadienone oximes, etc. may be named for example.

The preferred phosphorus halides used as the rearranging reagents in this process are phosphorus pentachloride, phosphorus trichloride, phosphorus tribromide and phosphorus pentabromide. The amount of the rearranging reagents used is normally no less than 1 mol equivalent to alicyclic α-(alkylthio) oximes, particularly 1–3 mol equivalents.

The reaction temperature normally ranges from —30 to 80° C., preferably from —10 to 20° C. The subject reaction is exothermic, and the temperature rise caused thereby tends to make the product colored or tarry. Therefore the temperature must be carefully controlled. Particularly when the amount of the rearranging reagents is in too large an excess, when the product is decomposed with water in a post-treatment a rapid temperature rise takes place often accompanied by hydrolysis of the nitril group of the object aliphatic ω-cyanoaldehydes to form an amide group or a carboxyl group, or by a reaction to form the dimer through aldol condensation, and therefore sufficient cooling is required.

While any organic solvent which is inert to the rearranging reagents can be used as the reaction medium, normally ether type solvents such as ethylether, tetrahydrofuran and dioxane are preferred.

According to Process B–5, the object aliphatic linear ω-cyanoaldehydes are obtained in high yields, and there are advantages including the few reaction stages and the very mild reaction conditions.

Process B–5 is further characterized in that, when applied to unsaturated alicyclic α-(alkylthio) oximes such as α-(alkylthio) cyclododecadienone oximes, it nevertheless results in the corresponding unsaturated aliphatic ω-cyanoaldehydes as the ring cleavage takes place while retaining the unsaturated bond.

Again when the alicyclic α-(alkylthio) oximes which are the starting material of this process are treated with conventionally known rearranging reagents such as sulfuric acid, polyphosphoric acid, etc., amide compounds are obtained instead of the aliphatic ω-cyanoaldehyde.

Further according to the present invention, the object product may be directly obtained from alicyclic α-chlorooximes which are the starting material of the foregoing Process A, without using said Process A, by means of Process C hereinafter described. To wit, by heating alicyclic α-chlorooximes in the presence of alcohol and thereafter contacting the reaction product with water (Process C), aliphatic linear ω-cyanoaldehydes may be obtained.

Process C presumably proceeds based on the mechanism as follows.

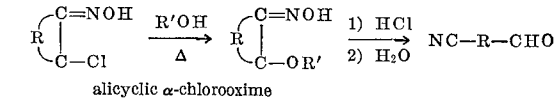

alicyclic α-chlorooxime in which R stands for a divalent radical forming the alicyclic portion and R′OH stands for an alcohol.

The alicyclic α-chlorooximes used as the starting material in this process are the same as those described in Process A, among which those of 5–12 membered ring compounds are preferred. The alicyclic portion may have a substituent group inert to the reaction such as an alkyl. As stated in Process A, the oximes may be in the form of addition salt such as hydrochloride.

While any compound having alcoholic hydroxyl groups is essentially useful as the alcohol to be used in Process C, from an economical standpoint, aliphatic alcohols of no more than 6 carbon atoms excluding tertiary alcohols are preferred, inter alia, methanol and ethanol being preferred. The function of such alcohol is, through the contact with alicyclic α-chlorooximes under heating, to displace the chlorine atom at α-position of the oxime group with an alkoxy group and to generate hydrochloric acid which in turn causes ring cleavage. As the result, very easy production of ω-cyanoaldehydes becomes possible. Since the alcohol also can serve as the reaction medium, it is normally used in large excess.

The heating temperature, i.e., the reaction temperature is normally about 50° C., particularly 80–100° C. The system should be kept anhydrous to the maximum possible extent to avoid side reactions such as hydrolysis. Again suitable addition of hydrogen chloride to the reaction system is recommended. The reaction product is then contacted with water and thereby is easily separated as ω-cyanoaldehydes.

Herein after the embodiments of this invention will be explained with reference to working examples. First, by way of reference, preparation of the intermediates used in the examples will be described.

REFERENCES 1–9

Production of alicyclic α-alkoxyoximes by Process A–1

Reference 1: A three necked round-bottom flask of 500 cc. capacity was equipped with a stirrer, a reflux condenser and a nitrogen inlet tube, and was charged with 100 cc. of methyl alcohol. 8.4 grams of sodium was added thereto to form an alcoholate solution at room temperature. 20 grams of α-chlorocyclohexanone oxime hydrochloride was dissolved in 100 cc. of methyl alcohol, which was gradually added into the flask by means of a dropping funnel. The reaction temperature was maintained at 50° C. under nitrogen atmosphere. After an hour of the reaction the reaction mixture was cooled, and the precipitated sodium chloride was removed by filtration and the filtrate was treated under a reduced pressure to remove methyl alcohol. The residue was extracted with ether. Thus 19 g. of α-methoxycyclohexanone oxime was obtained. The infrared absorption spectrum showed absorptions at 3,300 cm.$^{-1}$ due to hydroxy, at 1,660 cm.$^{-1}$ due to $-N=C<$ bond, and at 1,100 cm.$^{-1}$ due to $>C-OCH_3$.

Reference 2: In a 2 liter three necked round bottom flask similar to that used in above Reference 1, alcoholate was prepared from 500 cc. of methyl alcohol and 26 g. of sodium, and to which 100 g. of α-chlorocyclooctanone oxime dissolved in 400 cc. of methyl alcohol was added. After 2 hour reaction at 50° C., the system was cooled and the precipitated solid was removed. The filtrate was treated under a reduced pressure to remove methyl alcohol, and thereafter was treated with water and ether. From the ethereal solution 96 g. of α-methoxycyclooctanone oxime was obtained. When it was recrystallized from aqueous methyl alcohol, the product had a melting point of 62° C., and its structure was established by means of infrared absorption spectrum and elementary analysis.

Reference 3: Using a 500 cc. three necked round bottom flask similar to that used in Reference 1, sodium ethylate was prepared from 50 cc. of ethyl alcohol and 26 g. of sodium, and to which 10 g. of α-chlorocyclooctanone oxime dissolved in 50 cc. of ethyl alcohol was added dropwise over 30 minutes. The reaction system was heated at 80° C. for further 30 minutes and thereafter cooled. The precipitated solid was filtered, and the filtrate was treated under a reduced pressure to remove ethyl alcohol. The residue was extracted with ether, and from the ethereal layer 9.7 g. of a colorless solid was obtained. When it was recrystallized from aqueous ethyl alcohol, colorless crystals of melting point 84.5–85.5° C. were obtained. By means of elementary analysis, infrared absorption spectrum and nuclear magnetic resonance spectrum it was confirmed to be α-ethoxycyclooctanone oxime.

Reference 4: A 100 cc. three necked round-bottom flask was equipped with a stirrer, a cooling tube and a nitrogen inlet tube, and was charged with 10 g. of α-chlorocyclooctanone oxime dissolved in 50 cc. of ethyl alcohol. To the same 2.5 mol equivalents of sodium hydroxide were added and the reaction mixture was kept at 70° C. for an hour to produce α-ethoxycyclooctanone oxime in a yield of 75%.

Reference 5: A 300 cc. three necked round-bottom flask was equipped with a stirrer, a reflux condenser and a nitrogen inlet tube, and was partially filled with 160 cc. of isoproply alcohol and 2 g. of sodium. When the alcoholate formation was completed, 10 g. of α-chlorocyclooctanone oxime dissolved in 500 cc. of isopropyl alcohol was added dropwise thereinto. Immediately after the addition started, precipitation of sodium chloride was observed and the reaction solution became turbid. After heating at 80° C. for 30 minutes further, the reaction mixture was filtered, and the solvent was removed under a reduced pressure. The residue was treated with water and ether. From the ether layer α-isopropoxycyclooctanone oxime was obtained in a yield of 80%.

Reference 6: A 300 cc. three necked round-bottom flask was equipped with a stirrer, a reflux condenser and a nitrogen inlet tube. 160 cc. of tert.-butanol and 1.7 g. of sodium were placed in the flask to prepare sodium tert.-butoxide under reflux. After the sodium was completely dissolved, 10 g. of α-chlorocyclooctanone oxime was added thereto and the reaction mixture was kept for an hour at 80° C. Thereafter the system was treated as described in the preceding reference and α-tert.-butoxycyclooctanone oxime was obtained in a yield of 80%.

Reference 7: Under the same conditions as in Reference 6, 10 g. of α-chlorocyclooctenone oxime and 2 mol equivalents of sodium ethoxide were treated in ethyl alcohol. α-Ethoxycyclooctenone oxime was obtained in a yield of 82%.

Reference 8: Under the same conditions as in Reference 6, 10 g. of 2-chlorocyclododecadiene-5.9-one oxime and 2 mol. equivalents of sodium ethoxide were treated in ethyl alcohol. 2-ethoxycyclododecadiene-5.9-one oxime was obtained in a yield of 90%.

Reference 9: Under the same conditions as in Reference 6, 10 g. of α-chlorocyclododecanone oxime and 2 mol. equivalents of sodium ethoxide were treated in ethyl alcohol to produce α-ethoxycyclododecanone oxime in a yield of 95%.

Next an experiment was carried out to prove that when a non-alcoholic solvent was used, it is substantially impossible to obtain α-alkoxyoxime by treatment with an equivalent amount of sodium alkoxide.

When 10 g. of α-chlorocyclooctanone oxime was treated with 1 mol equivalent of sodium ethoxide in tetrahydrofuran, the solution turned blue during the reaction and 1-nitrosocyclooctene was obtained. After removal of the solvent a white solid was quantitatively obtained, which contained no chlorine atom and was assumed to be the dimer-hexamer containing no alkoxy group from its molecular weight and spectroscopic analysis.

REFERENCES 10–16

Production of alicyclic α-acyloxyoximes by Process A–2a

Reference 10: In a 300 cc. three necked round-bottom flask equipped with a stirrer, a reflux condenser and a dropping funnel, 8.2 g. (0.1 mol) of sodium acetate and 100 cc. of acetone were mixed. With stirring 8.8 g. (0.05 mol) of α-chlorocyclooctanone oxime dissolved in 50 cc. of acetone were added dropwise thereinto at room temperature. The reaction liquid turned blue, and the addition was completed within 30 minutes. During the subsequent 90 minutes of stirring, the reaction liquid turned from light green to substantially colorless. For completing the reaction the reaction mixture was heated by means of a steam bath and the solution was refluxed for an hour. After the reaction was completed the reaction mixture was filtered, and the precipitate was washed with 50 cc. of acetone. The filtrate and washing were mixed and solvent was removed under a reduced pressure. Thus 9.5 g. of a solid having a melting point of 75–82° C. was obtained. When it was recrystallized from cyclohexane, 6.7 g. of α-acetoxycyclooctanone oxime having a melting point of 92–93° C. was obtained in a state of white crystals. The yield was 67%.

Reference 11: By exactly the same process as described in Reference 10, reactions were performed in various solvents using various amounts of sodium acetate to similarly produce α-acetoxycyclooctanone oxime. The results are shown in Table 1 below.

TABLE 1

| α-Chlorocyclo-octanone oxime | Sodium acetate | Solvent | Yield G. | Percent |
| --- | --- | --- | --- | --- |
| 8.8 g. (0.05 mol) | 4.1 g. (0.05 mol) | Acetone | 4.7 | 47 |
| 8.8 g. (0.05 mol) | 20.5 g. (0.25 mol) | do | 7.5 | 75 |
| 8.8 g. (0.05 mol) | 4.1 g. (0.05 mol) | Tetrahydrofuran | 4.6 | 46 |
| 8.8 g. (0.05 mol) | 8.2 g. (0.1 mol) | do | 8.0 | 80 |
| 8.8 g. (0.05 mol) | 8.2 g. (0.1 mol) | Benzene | 3.2 | 32 |

Reference 12: In a 300 cc. round bottom flask equipped with a stirrer, a reflux condenser and a dropping funnel, 8 g. of sodium acetate and 100 cc. of tetrahydrofuran were mixed. With stirring 7 g. of α-chlorocyclohexanone oxime dissolved in 50 cc. of tetrahydrofuran were then added to the mixture at room temperature. The solution turned blue and the addition was completed within 30 minutes. The stirring was continued for an additional hour at 50° C. After completion of the reaction the solid was filtered out and the solvent was removed from the filtrate to produce α-acetoxycyclohexanone oxime in a yield of 60%.

Reference 13: In a 300 cc. round bottom flask equipped with a stirrer, a reflux condenser and a dropping funnel, 8 g. of sodium acetate was mixed with 100 cc. of tetrahydrofuran. To the mixture 10 g. of α-chloroxyclododecadienone oxime dissolved in 50 cc. of tetrahydrofuran was added dropwise at room temperature with stirring. Immediately after the addition started the solution turned blue and then later became colorless. After 2 hours of reaction at 50° C., the reaction mixture was treated as in the preceding reference to produce 9 g. of α-acetoxycyclododecadienone oxime.

Reference 14: In a 300 cc. round bottom flask equipped with a stirrer, a reflux condenser and a dropping funnel, 10 g. of sodium formate was suspended in 100 cc. of tetrahydrofuran. Into the mixture 6 g. of α-chlorocyclooctanone oxime dissolved in 50 cc. of tetrahydrofuran were added dropwise at room temperature with stirring. After 3 hours of the reaction at 50° C., the reaction mixture was treated as in the preceding reference to produce 5.4 g. of α-formyloxycyclooctanone oxime.

Reference 15: Under the same reaction conditions as in Reference 13, sodium benzoate and α-chlorocyclooctanone oxime were treated to produce α-benzoyloxycyclooctanone oxime in a yield of 80%.

Reference 16: Reference 10 was repeated except that sodium acetate was replaced by an equivalent amount of potassium acetate, the produce α-acetoxycyclooctanone oxime in a yield of 65%.

REFERENCES 17–23

Production of alicyclic α-aminooximes from alicyclic α-acyloxyoximes by Process A-2b Reference 17: Two (2) g. of α-acetoxycyclohexanone oxime were placed in a 100 cc. round bottom flask equipped with a reflux condenser, and were treated with 2.5 g. of piperidine dissolved in 50 cc. of ethanol under reflux. After completion of the reaction, ethanol was removed under a reduced pressure, and to the residue a small amount of water was added. Thereafter it was extracted with a large amount of ethylether. The extract was dried, and the removal of ether afforded 2.0 g. of α-piperidinocyclohexanone oxime (yield=87%). After recrystallization from ether, the product had a melting point of 117–8° C.

Reference 18: In a 100 cc. round bottom flask equipped with a reflux condenser, 4 g. of α-acetoxycyclooctanone oxime and 4 mol. equivalents of morpholine were reacted for 3 hours in 50 cc. of ethanol under reflux. After completion of the reaction the ethanol was removed from the system under a reduced pressure, and the residue was allowed to stand to crystallize after addition of a small amount of water thereto. The reaction mixture was then filtered and the solid was washed twice to remove any soluble matter using a small amount of ether, to produce 21 g. of α-morpholinoxycyclooctanone oxime in a yield of 93%. Recrystallization from ethanol afforded a product, M.P. 133–4° C.

By exactly the same process, 4 g. samples of α-acetoxycyclooctanone oxime were each treated with one mol and two mol of morpholine to produce α-morpholinocyclooctanone oxime in the yields, respectively of 33% and 57% (based on the α-acetoxycyclooctanone oxime). Also from the ether-soluble portion, respectively 49% and 20% of α-acetoxycyclooctanone oxime were recovered.

Reference 19: Ammonia was dissolved in 100 cc. of dimethylsulfoxide to the saturation point, and to this solution 4 g. of α-acetoxycyclooctanone oxime were added. The mixture was then heated in a glass pressure bottle to 100° C. for 10 hours. After completion of the reaction the reaction mixture was poured into a large amount of water to give a solid material on standing. Thereafter the solid was filtered to produce about 3 g. of bix(α-oxyiminocyclooctyl) amine which corresponds to a yield of 90%. Recrystallization from ethylether yielded a pure substance having a melting point of 186–187° C.

Reference 20: In a 100 cc. round bottom flask equipped with a reflux condenser, 500 cc. of dimethylsulfoxide, 2.6 g. of α-benzocyclooctanone oxime and 3.6 g. of aniline were heated for 4 hours on a steam bath. After completion of the reaction, the reaction mixture was poured into a large amount of water, and the water-insoluble oily substance was crystallized on standing. The solid was filtered, and the crystals were washed with a small amount of ether to produce 1.4 g. of α-anilinocyclooctanone oxime which corresponds to a yield of 60%. Recrystallization from ethanol afforded a product having a melting point of 135–6° C.

Reference 21: Using 2.4 g. of α-acetoxycyclododecadienone oxime and 3 mol equivalents of morpholine, the reaction and treatments of the product were performed in the same manner as in Reference 18, to produce 2.6 g. of α - morpholinocyclododecadienone oxime which corresponds to a yield of 95%. Recrystallization from methanol yielded a product having a melting point of 109° C.

Reference 22: Using 2 g. of α-acetoxycyclododecanone-oxime and 3 mol equivalents of piperidine, the reaction and treatments of the product were performed in the same manner as in Reference 18, to produce 2.0 g. of α-piperidinocyclododecanone oxime which corresponds to a yield of 91%. After recrystallization from methanol, the product had a melting point of 96–7°C.

Reference 23: Into a 300 cc. three necked round-bottom flask equipped with a reflux condenser, a stirrer and a thermometer, 100 cc. of dimethyl-sulfoxide, 30 cc. of water, 4 g. of hydroxylamine hydrochloride and 0.1 mol of sodium carbonate were placed and stirred. When generation of gas ceased, to the reaction mixture 4 g. of α-acetoxycyclooctanone oxime were added in small portions. The stirring was continued while the reaction mixture was heated to about 90° C. for 3 hours on a steam bath. After completion of the reaction the reaction mixture was poured into a large amount of water and the precipitated solid was filtered. 2.8 grams of α-(hydroxylamino) cyclooctanone oxime was obtained, which corresponds to a yield of 81%. After recrystallization from methanol, the product had a melting point of 144–5° C.

REFERENCES 24–27

Production of alicyclic α-(alkylthio) oximes by Process A–3

Reference 24: To 30 cc. of ethanethiol in a 300 cc. three necked round-bottom flask equipped with a stirrer and a reflux condenser, 3.5 g. of metal sodium were added with stirring. Because the resultant thiolate is insoluble in ethanethiol, 30 cc. of tetrahydrofuran were added to the system to form a suspension, to which 20 g. of α-chlorocyclooctanone oxime dissolved in tetrahydrofuran were added dropwise over an hour. Immediately after the addition the reaction mixture turned blue. After 3 hours of stirring the reaction was stopped, and the sodium chloride formed was separated by filtration. The filtrate was concentrated, and extracted several times with ether after adding water. By removal of ether under a reduced pressure, a light yellow solid of needle crystals was obtained in an amount of 16.5 g. (yield=72%) which was experimentally confirmed to be α-(ethylthio) cyclooctanone oxime, M.P. 95–96.5° C.

Reference 25: In a 500 cc. three necked round-bottom flask equipped with a stirrer and a condenser, thiolate was formed from 60 cc. of ethanethiol and 8 g. of metal sodium, and the thiolate was suspended in tetrahydrofuran. The mixture was treated with 35 g. of α-chlorocyclododecadienone oxime dissolved in tetrahydrofuran for 3 hours at 40° C. The solution was concentrated, and extracted with ether to produce 31 g. (yield=80%) of α-(ethylthio) cyclododecadienone oxime.

Reference 26: In a 300 cc. three necked round-bottom flask equipped with a stirrer and a condenser, thiolate was formed from 30 cc. of ethanethiol and 4 g. of metal sodium, and the thiolate was suspended in anhydrous dioxane. To the mixture, 15 g. of α-chlorocyclohexanone oxime dissolved in dioxane were added and reacted for 2 hours at 40° C. Then dioxane was distilled off, and the residue was concentrated, treated with water and ether. From the ether-layer 1.45 g. (yield=83%) of α-(ethylthio) cyclohexanone oxime was obtained. From a similar reaction employing ethylether as the solvent performed under reflux, α-(ethylthio) cyclohexanone oxime was obtained in a yield of 80%.

Reference 27: Reference 24 was repeated except that the metal sodium was replaced by 4.5 g. of metal potassium, to produce 12.6 g. (yield=55%) of α-(ethylthio) cyclooctanone oxime.

EXAMPLES 1–5

Production of aliphatic linear ω-cyanoaldehydes by Process B–1

Example 1: To 2 g. of α-ethoxycyclooctanone oxime dissolved in 20 cc. of ethanol, 0.4 g. (1.03 mol equivalents) of hydrogen chloride were dissolved. The solution was heated at 100° C. for 3 hours in a sealed tube, from which ethanol was subsequently distilled off. The residue was treated with water and extracted with ether. A brown liquid thus obtained was purified by means of chromatography to give 7-cyanoheptanal in a yield of 48%.

Example 2: By repeating Example 1 except that the amount of hydrogen chloride was made 0.2 g. (0.5 mol. equivalent), a brown, oily substance was obtained. By means of infrared absorption spectrum, it was found to be a mixture of the starting α-ethoxycyclootanone oxime and 7-cyanoheptanal.

Example 3: To 2 g. of α-methoxycyclohexanone oxime dissolved in 20 cc. of methanol, 0.45 g. (1.05 mol equivalent) of hydrogen chloride were added, and the mixture was treated as in Example 1. 5-cyanopentanal was obtained in a yield of 76%.

Example 4: To 20 g. of α-ethoxycyclododecadienone oxime dissolved in 150 cc. of ethanol, 1.1 mol. equivalents of hydrogen chloride were dissolved and the solution was heated to 100° C. for 3 hours in a sealed tube. After distilling off the ethanol under a reduced pressure, the residue was added to 100 cc. of water and shaken for an hour. By extraction with ether a brown oily substance was obtained, from which 13 g. of 11-cyanoundecadienal (yield=79.3%) was obtained by distillation under a reduced pressure.

Example 5: To 3 g. of α-methoxycyclooctenone oxime dissolved in 20 cc. of methanol, 1.1 mol. equivalents of hydrogen chloride were added, and the solution was treated as in Example 4 to yield 1.6 g. (=65.9%) of 7-cyanoheptenal.

EXAMPLES 6–11

Production of aliphatic linear ω-cyanoaldehydes by Process B–2

Example 6: Five (5) grams of α-ethoxycyclooctanone oxime and 7.5 g. (1.06 mol. equivalents) of triphenylphosphine were dissolved in 100 cc. of benzene, and the solution was placed in a 300 cc. three necked round-bottom flask equipped with a stirrer, a condenser and a gas inlet tube. When chlorine gas was introduced thereinto at room temperature with stirring, an exothermic reaction took place to raise the temperature of the solution to about 50° C. The introduction of the gas was continued for 20 minutes, and after the heat generation ceased and the temperature fell, 80 cc. of water were added to the reaction mixture with stirring for 30 minutes. The benzene-layer was separated, and the aqueous layer was extracted with ether. The benzene layer and the ether layer were then combined and dried over sodium sulfate. By removal of the solvents, a light yellow liquid was obtained. When the liquid was treated with a small amount of ether and allowed to stand at a cool place, triphenylphosphine oxide precipitated, which subsequently was filtered off. The filtrate was distilled under a reduced pressure to yield 3.4 g. (90%) of ω-cyanoaldehyde. From its analytical values (as 2,4-dinitrophenylhydrozone) and infrared spectrum, it was confirmed to be 7-cyanoheptanal.

Example 7: Five (5) grams of α-methoxycyclododecadienone oxime or 2-methoxycyclododecadene-5,9-one oxime and 6 g. (1.02 mol. equivalent) of triphenylphosphine were dissolved in benzene and into the solution chlorine gas was introduced at room temperature. An exothermic reaction took place to raise the temperature of the solution to about 50° C., which ceased after 15 minutes and the temperature started to fall. Then the reaction mixture was treated with water with stirring for 35 minutes and extracted with ether. The ether layer was dried over sodium sulfate and the solvent was removed. The residue was combined with a small amount of ether and allowed to stand at a cool place. Thus precipitated triphenylphosphine oxide was filtered off and the filtrate was condensed and separated by means of alumina column chromatography to yield a light brown oily substance. The yield was 3.5 g. (81.8%). By means of infrared spectrum, the product was confirmed to be mainly 11-cyanoundecadiene-4,8-al.

Again when the similar reaction was performed using tributylphosphine, the yield of the ω-cyanoaldehyde was 86%.

Example 8: α-ethoxycyclohexanone oxime was treated with triphenylphosphine and chlorine in the manner as described in Example 7, and the product was distilled under a reduced pressure. 5-cyanopentanal was obtained in a yield of 68%.

Example 9: α-ethoxycyclooctanone oxime was treated with triphenylphosphine and bromine in the manner as described in Example 7. 7-cyanoheptanal was obtained in a yield of 75%.

EXAMPLES 10–11

Under quite similar conditions to those of Example 6 except the below specified items in Table 2, experiments were run to produce each time the object ω-cyanoaldehydes.

TABLE 2

| Ex. No. | Starting material | Phosphorus compound | Halogen | Solvent | Yield (percent) |
|---|---|---|---|---|---|
| 10 | Isopropoxycyclohexanone oxime. | Methyldiphenylphosphine. | Bromine | Benzene | 85 |
| 11 | Ethoxycyclohexanone oxime. | Tributylphosphine | Chlorine | Tetrahydrofuran. | 80 |

EXAMPLES 12–19

Production of aliphatic linear ω-cyanoaldehydes by Process B–3

Example 12: In 30 cc. of anhydrous ethylether, 2 g. of α-ethoxycyclooctanone oxime were dissolved, and the solution was cooled with ice water with stirring. While the cooling was continued, 4 g. (1.78 mol equivalents) of phosphorus pentachloride were added to the system in small portions over 20 minutes and the stirring was continued for further 30 minutes. Then ice water was removed and the stirring was continued for an additional hour at room temperature. After cooling the reaction mixture with ice water, the solution was treated with water little by little. Heat and hydrogen chloride were generated. The addition of water was continued until generation of heat was no longer observed, and the hydrolysis was continued for an additional 2 hours with stirring. Then the reaction solution was treated with a large amount of water and extracted with ether. Distilling the ether off, a brown liquid was obtained. The yield of the crude product was 1.2 g. (80%). By vacuum distillation, a light yellow liquid was obtained (120–125° C./1 mm. Hg), which was confirmed to be 7-cyanoheptanal from its infrared spectrum and elementary analysis. Again by treating the liquid with 2,4-dinitrophenylhydrazine, yellow needle-like crystals were obtained which were confirmed to be the hydrazone, M.P. 74–75° C., of 7-cyanoheptanal.

Calcd. for $C_{14}H_{16}N_5O_4$ (percent): C, 52.66; H, 3.37; N, 21.93. Found (percent): C, 52.80; H, 3.32; N, 21.83.

Example 13: Into a 500 cc. three necked round-bottom flask equipped with a stirrer, a dropping funnel and a drying tube filled with calcium chloride, 100 cc. of anhydrous ethylether and 60 g. (1.07 mol equivalents to oxime) of phosphorus pentachloride were placed with vigorous stirring while cooled with ice water, to form a suspension. Into the suspension, 50 g. of α-ethoxycyclooctanone oxime dissolved in 100 cc. of ether were added dropwise over 40 minutes, and the stirring was continued for 3 hours. Then the drying tube was removed from the flask. To the system water was added in small portions, which caused violent generation of hydrogen chloride. After the gas generation ceased, 300 cc. of water was added into the system followed by 6 hour stirring at room temperature. The brown reaction solution was extracted with ether several times. After drying and removal of the solvent by distillation, 29.5 g. (79%) of a light brown liquid was obtained, which was confirmed to be 7-cyanoheptanal from its infrared spectrum. It was also recognized that the liquid contained a small amount of an amide formed by hydrolysis of the nitrile.

Example 14: Under the same reaction conditions as in Example 13, α-ethoxycyclooctanone oxime was treated in the same manner. The reaction solution was treated with water and extracted with ether after only 15 minutes' stirring. In this case, a brown oily substance different from the object product was obtained, which became a blackish brown and tarry during standing. It was considered to be a condensation product of α-ethoxycycloactanone oxime and phosphorus pentachloride.

Example 15: In a 500 cc. three necked round-bottom flask, 70 g. of α-methoxycyclooctanone oxime were treated with 100 g. (1.17 mol equivalent) of phosphorus pentachloride overnight, in anhydrous ethylether as the reaction medium. Water was added to the reaction solution followed by 5 hour stirring and the reaction mixture was extracted with ether. 51 g. (crude yield 90%) of a brown liquid was obtained, which was recognized to be 7-cyanoheptanal and a small amount of an amide from its infrared spectrum.

Example 16: In 30 cc. of anhydrous ethylether 2 g. of α-methoxycyclohexanone oxime was dissolved, and the solution was ice-cooled with stirring. To the solution 4 g. (1.38 mol. equivalent) of phosphorus pentachloride were added over 20 minutes, followed by 3 hour stirring. Thereafter water was added to the reaction solution little by little, while the stirring was continued for additional 3 hours. By ether extraction of the reaction solution, 1 g. (64%) of a brown liquid was obtained, which was confirmed to be 5-cyanopentanal by means of infrared spectrum and an elemental analysis of 2,4-dinitrophenylhydrazone, M.P. 97–98° C.

Calcd. for $C_{12}H_{13}N_5O_4$ (percent): C, 49.48; H, 4.50; N, 24.05. Found (percent): C, 49.54; H, 4.57; N, 23.50.

Example 17: In a 300 cc. three necked round-bottom flask equipped with a stirrer, a dropping funnel and a drying tube filled with calcium chloride, 100 cc. of anhydrous ethylether and 20 g. (1.43 mol. equivalent to oxime) of phosphorus pentachloride were placed and violently stirred while ice-cooled to form a suspension. Into the suspension 15 g. of α-methoxycyclododecadienone oxime dissolved in ether were added dropwise over an hour, followed by 3 hour stirring. Thereafter water was added gradually to the mixture, and after the subsequent violent generation of hydrogen chloride gas ceased, 100 cc. of water were added thereto followed by 5 hour stirring. By ether extraction of the reaction solution, a light brown liquid was obtained in a yield of 11.5 g. (89%), which was confirmed to be 11 - cyanoundecadienal by means of infrared spectrum.

Example 18: In a 300 cc. three necked round-bottom flask equipped with a stirrer, a dropping funnel and a drying tube filled with calcium chloride, 100 cc. of anhydrous ethylether and 20 g. (1.43 mol. equivalent to oxime) of phosphorus pentachloride were placed and violently stirred while ice-cooled to form a suspension. Into the suspension 15.2 g. of α-methoxycyclododecanone oxime dissolved in ether were added dropwise over an hour, followed by 3 hour stirring. Then water was added thereto little by little and after the subsequent violent generation of hydrogen chloride gas ceased, 100 cc. of water were added thereto followed by 5 hour stirring. By ether extraction of the reaction solution, a light brown liquid was obtained in an amount of 11 g., which was confirmed to be 11-cyanoundecanal from its infrared spectrum and elementary analysis. The 2,4-dinitrophenylhydrazone, M.P. 90–92° C., gave the following analytical results.

Calcd. for $C_{18}H_{25}N_5O_4$ (percent): C, 57.58; H, 6.71; N, 18.66. Found (percent): C, 57.64; H, 6.73; N, 18.47.

Example 19: Example 18 was repeated except that thionyl chloride was used as the rearranging reagent in place of phosphorus pentachloride, to produce ω-cyanoaldehyde in a yield of 60%.

EXAMPLES 20–27

(Production of aliphatic linear ω-cyanoaldehydes by Process B–4

Example 20: In a 50 cc. three necked round-bottom flask equipped with a stirrer, a thermometer and a drying tube filled with calcium chloride, 200 cc. of anhydrous ethylether and 1 g. of α-morpholinocyclooctanone oxime were stirred together while cooled with ice, to which 15 g. of phosphorus pentachloride were added little by little while the reaction temperature was maintained at 0–5° C., followed by 6 hour stirring. The reaction product was poured into about 300 g. of ice water, and stirred for 30 minutes. After being allowed to stand overnight, the reaction product was extracted with ether. After drying the etheral solution and removal of the solvent, 4.5 g. of a light yellow liquid were obtained (yield=73%). From its infrared absorption spectrum and the elementary analysis of the yellow needle crystals obtained by its treatment with 2,4-dinitrophenylhydrazine, the liquid was confirmed to be 7-cyanoheptanal.

Example 21: Example 20 was repeated except that 10 g. of thionyl chloride was used in place of phosphorus pentachloride. 7-cyanoheptanal was obtained in a yield of 56%.

Example 22: Into a 100 cc. round-bottom flask equipped with a reflux condenser were placed 7 g. of α-piperidinocyclooctanone oxime, 15 cc. of acetic acid, and 15 cc. of acetic anhydride. After being maintained at room temperature for an hour, the solution was gradually heated and refluxed for an hour. To the reaction product a small amount of water was added to decompose the remaining acetic anhydride, and thereafter the product was distilled under a reduced pressure to yield 2.9 g. of a light yellow liquid (120–125° C./2 mm. Hg, yield=65%). By means of infrared absorption spectrum and a mixed melting point method of its 2,4-dinitrophenylhydrazone with an authentic sample, the liquid was confirmed to be 7-cyanoheptanal.

Example 23: To 100 cc. of anhydrous ether, 6.5 g. of α-morpholinocyclododecanone oxime were added, and the solution was cooled with ice water, while being stirred electromagnetically. While the cooling was continued, 10 g. of phosphorus pentachloride were added to the solution little by little, followed by stirring for an hour. Then the stirring was continued for 2 hours at room temperature. The hydrolysis of the reaction mixture was mildly carried out under cooling with ice-water. After the generation of hydrogen chloride gas and heat could no longer be observed, stirring was continued for 3 hours. Then a large amount of water was added to the reaction mixture, which subsequently was extracted with ether. After drying the etheral layer and removal of the solvent, 3.8 g. of a light yellow liquid was obtained (yield=84%). By means of infrared absorption spectrum and elementary analysis of its 2,4-dinitrophenylhydrazone, the liquid was confirmed to be 11-cyanoundecanal.

Further the same liquid gave quantitatively a while solid melting at 47° C. after standing overnight. From the spectroscopic and chemical evidence, it was presumed to be a trioxane type trimer.

Example 24: Example 22 was repeated except that 8 g. of α-piperidinocyclododecadienone oxime was used, to obtain a light yellow liquid as a fraction of distillate at 95–120° C./1 mm. Hg. From its infrared absorption spectrum and elemental analysis of the 2,4-dinitrophenylhydrazone, the liquid was confirmed to be 11-cyanoundecadienal. The yield was 3.8 g. (69%).

Example 25: Example 23 was repeated except that 5 g. of α-(n-butylamino) cyclohexanone oxime were used. The product obtained in an amount of 1.5 g. (yield=54%) was confirmed by experiment to be 5-cyanopentanal.

Example 26: In a 500 cc. three necked round-bottom flask equipped with a stirrer and a thermometer, 100 cc. of anhydrous ether and 7 g. of α-anilinocycloctanone oxime were placed, and cooled with ice. While the reaction temperature was controlled within the range of −5 to 5° C., 1 g. of phosphorus pentachloride was added to the solution over 10 minutes, followed by 6 hours of stirring. After the reaction, about 300 g. of ice water were added to the reaction mixture at one time, followed by over night stirring. The reaction mixture was then extracted with ether. After the usual treatments of the ether-layer, twenty-five (25) g. of a light yellow liquid were obtained. From the test result it was confirmed that the liquid was 9-cyano-2-(5-cyanopentyl)-2-nonenal obtained from aldol condensation of 7-cyanoheptanal. The yield was 64%.

Example 27: Using the same laboratory equipments and under the same operational conditions as in Example 20, 10 g. of α-morpholinocyclooctanone oxime were treated with 15 g. of phosphorus pentachloride. After reaction for an hour at 0–5° C., the reaction mixture was treated as in Example 20 to yield 3.2 g. of a light yellow liquid. From identification of its infrared absorption spectrum with an authentic sample, the liquid was confirmed to be 7-cyanoheptanal.

EXAMPLES 28–31

(Production of aliphatic linear ω-cyanoaldehydes by Process B–5)

Example 28: In 50 cc. of anhydrous ethylether 4 g. of α-(ethylthio)cyclohexanone oxime were dissolved and the solution was cooled with ice water while being electromagnetically stirred. Into the solution 7 g. (1.45 mol equivalents) of phosphorus pentachloride were added in small portions over 30 minutes, followed by 2 hours of stirring while the cooling was continued. After the reaction the reaction mixture was poured into ice-water, stirred for a short time and extracted several times with ether. After distilling the ether off, a brown liquid was obtained. The crude yield was 22 g. (86%). From the comparison of spectroscopic data, the liquid was confirmed to be 5-cyanopentanal.

Example 29: In a 300 cc. three necked round-bottom flask equipped with a stirrer, a dropping funnel and a drying tube filled with calcium chloride, 50 cc. of ethylether and 12 g. (1.15 mol equivalent to oxime) of phosphorus pentachloride were placed and stirred to form a suspension while cooled with ice water. Into the suspension 10 g. of α-(ethylthio)cyclooctanone oxime dissolved in 100 cc. of ethylether were added dropwise over 30 minutes, followed by 3 hours of stirring while the cooling was continued. After the reaction, the reaction solution was poured into ice water and shaken for 15 minutes, followed by an ether extraction. From the ethereal layer a brown liquid was obtained in a yield of 5.9 g. (85%), which was confirmed to be 7-cyanoheptanal from its infrared spectrum.

Example 30: In a 500 cc. three necked round-bottom flask equipped with a stirrer, a dropping funnel and a drying tube filled with calcium chloride, 100 cc. of ethylether and 30 g. (1.2 mol. equivalent) of phosphorus pentachloride were placed, and stirred to form a suspension while cooled with ice. Into the suspension 30 g. of α-(ethylthio)cyclododecadienone oxime dissolved in 200 cc. of ether were added dropwise over an hour, followed by 3 hours of stirring. The reaction solution was poured into ice water and extracted with ether to yield 22 g. (97%) of a brown liquid, which was confirmed to be 11-cyanoundecadienal from its infrared spectrum.

Again performing a similar reaction using dioxane as the reaction medium, 11-cyanoundecadienal was obtained in a yield of 65%.

Example 31: Example 28 was repeated except that the phosphorus pentachloride was replaced by 5 g. of phosphorus oxychloride, to yield 20 g. of 5-cyanopentanal.

EXAMPLES 32–38

(Production of aliphatic linear ω-cyanoaldehydes by Process C)

Example 32: Twenty (20) g. of α-chlorocyclohexanone oxime hydrochloride were dissolved in 150 cc. of methanol, and the solution was heated for 3 hours in a sealed tube over a steam bath. Methanol was distilled off under a reduced pressure, and the solution was cooled and treated with 150 cc. of water followed by 30 minutes' violent stirring. After extracting the reaction product with ether, a brown oily substance was obtained, which was distilled under a reduced pressure (65–79° C./0.25 mm. Hg) to yield 2.8 g. (20.4%) of a light yellow liquid. From its infrared absorption spectrum, the liquid was confirmed to be 5-cyanopentanal.

Example 33: Twenty (20) g. of α-chlorocyclooctanone oxime were dissolved in 150 cc. of methanol, and the solution was heated for 3 hours in a sealed tube over a steam bath. Methanol was distilled off under a reduced pressure, leaving a brown oily substance. The oil was dissolved in a small amount of ether, treated with 200 cc. of water with stirring for an hour. After extracting the reaction product with ether, a brown oily substance was obtained, from which 8.5 g. (54%) of a light yellow liquid was obtained by means of distillation under a reduced pressure. The liquid was confirmed to be 7-cyanoheptanal from its infrared absorption spectrum.

Example 34: Twenty (20) g. of α-chlorocyclododecadienone oxime was dissolved in 150 cc. of methanol, and the solution was heated for 3 hours in a sealed tube over a steam bath to 95–100° C., followed by distilling off of the methanol. The reaction product was violently stirred for an hour after addition of 150 cc. of water thereto, and then extracted with ether to yield a brown oily substance, from which 12.8 g. (76.2%) of a light yellow liquid were obtained by means of distillation under a reduced pressure. The said liquid was confirmed to be 11-cyanoundecadienal from its infrared absorption spectrum.

Example 35: Twenty (20) g. of α-chlorocyclooctanone oxime were dissolved in 150 cc. of ethanol and treated as in Example 34 to produce 7-cyanoheptanal in a yield of 63.0%.

Example 36: Twenty (20) g. of α-chlorocyclododecadienone oxime were dissolved in 150 cc. of ethanol and treated as in Example 34 to produce 11-cyanoundecadienal in a yield of 68.3%.

Example 37: 2.5 grams of α-chlorocyclododecanone oxime were dissolved in 20 cc. of ethanol, and the solution was heated to 90° C. for 3 hours in a sealed tube, followed by addition of 100 cc. of water and 30 minutes shaking. By extraction of the reaction product with ether, 1.3 g. of a light brown liquid were obtained (61.6%), which was confirmed to be substantially pure 11-cyanoundecanal from its infrared absorption spectrum.

Example 38: Two (2) g. of α-chlorocyclooctanone oxime were dissolved in 10 cc. of ethanol, and the solution was heated at 60° C. for 3 hours in a sealed tube, followed by distillation off of the ethanol under reduced pressure. Water was added to the product which was subsequently neutralized with sodium carbonate and extracted with ether to yield an oily substance. The product was purified by means of chromatography on a silica gel column, to yield colorless crystals having a melting point of 84–85° C. which were confirmed to be α-ethoxycyclooctanone oxime, because its infrared absorption spectrum was identical with the said compound synthesized by ether means.

EXAMPLE 39

Production of 6-cyanohexanal by application of Process B-3

4.1 grams of 2-chlorocycloheptanone oxime, which were obtained with ease by reacting cycloheptene with nitrosyl chloride in the presence of hydrochloric acid, were reacted with 3 mol equivalents of triethylamine in 150 cc. of absolute ethanol for an hour at room temperature. Thereafter, the ethanol was removed under a reduced pressure. To the filtrate water and ether was added, and the ether-layer was dried with anhydrous sodium sulfate. Ether was removed from the system, and the residue was distilled under a reduced pressure to obtain 25 g. (70.6%, B.P. 97–98° C./1.7 mm. Hg.) of a colorless, transparent liquid. From its infrared absorption spectrum and elementary analysis, the liquid was confirmed to be 2-ethoxycycloheptanone oxime.

Calc'd for $C_9H_{17}O_2N$ (percent): C, 63.13; H, 10.00; N, 8,18. Found (percent): C, 63.24; H, 10.02; N, 8.04.

2.1 grams of the 2-ethoxycycloheptanone oxime were dissolved in 50 cc. of ether, and the solution was added dropwise into a suspension prepared from 100 cc. of ether and 2 mol equivalents of phosphorus pentachloride. In the meantime the reaction temperature was maintained at 2–5° C., and the reaction was continued for 90 minutes. Thereafter the reaction mixture was decomposed with ice water over 60 minutes, and extracted with a mixed solvent of ether-methylene chloride. After drying, the solvent was removed to yield 1.2 g. of crude 6-cyanohexanal. Its infrared absorption spectrum showed absorption of —CN at 2242 cm.$^{-1}$ and that of aldehyde at 2800 and 1720 cm.$^{-1}$. 2,4-dinitrophenylhydrazone showed M.P. 58–59° C., and its elemental analysis was as follows:

Calc'd for $C_{13}H_{15}O_4N_5$ (percent): C, 51.14; H, 4.95; N, 22.94. Found (percent): C, 51.25; H, 5.32; N, 22.78.

EXAMPLE 40

Production of 4-cyanobutanal by application of Process B-3

Ten (10) g. of 2-chlorocyclopentanone oxime, which can be obtained with ease from the reaction of cyclopentene with nitrosyl chloride in methylene chloride in the presence of hydrochloric acid, was dissolved in 150 cc. of absolute ethanol and was treated with an equivalent amount of triethylamine. Liquid 2-ethoxycyclopentanone oxime was obtained in an amount of 5.1 g. (B.P. 78–80° C./1.3–1.4 mm. Hg). The elemental analysis was as follows:

Calc'd for $C_7H_{13}O_2N$ (percent): C, 58.72; H, 9.15; N, 9.78. Found (percent): C, 58.41; H, 9.33; N, 10.00.

2.2 grams of the said 2-ethoxycycloheptanone oxime were dissolved in 50 cc. of ether, and the solution was added dropwise into a suspension of 2 mol. equivalents of phosphorus pentachloride in 100 cc. of ether. The reaction was performed for 90 minutes during which the reaction temperature was maintained at 2–5° C. After the reaction the mixture was decomposed for 60 minutes with ice water, followed by an extraction with ether-methylene chloride. After drying, the ether was removed to yield 1.0 g. of crude 4-cyanobutanal. Its infrared absorption spectrum showed the absorption of —CN at 2250 cm.$^{-1}$ and that of —CHO at 2750 and 1720 cm.$^{-1}$. 2,4-dinitrophenylhydrazone had a melting point of 116–117.5° C.

The elemental analysis was as follows:

Calc'd for $C_{11}H_{11}O_4N_5$ (percent): C, 47.65; H, 4.00; N, 25.26. Found (percent): C, 47.79; H, 4.25; N, 25.01.

UTILITY EXAMPLE

Preparation of α,ω-diamine

Ten (10) g. of 7-cyanoheptanal were dissolved in 100 cc. of ethanol saturated with ammonia, and reacted in an autoclave in the presence of 2 g. of Raney nickel catalyst under the initial hydrogen pressure of 110 kg./cm.$^2$ and at 70° C. for 12 hours. After the reaction the solvent was removed. Thus octamethylene diamine was obtained almost quantitatively. Again treating 5-cyanopentanal under the same conditions, hexamethylene diamine was obtained in a yield of 70%. These are useful as starting materials for nylon. Diamines of $C_5$–$C_{12}$ are obtained readily.

What is claimed is:

1. Linear ω-cyanoaldehydes of the general formula:

NC—R—CHO

wherein R is the deca-3:7-dienyl radical.

2. The process for the preparation of aliphatic linear ω-cyanoldehydes of the general formula NC—R′—CHO which consists essentially of reacting five to twelve-membered alicyclic α-substituted oximes of the general formula:

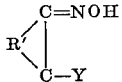

wherein R' is selected from saturated straight chain hydrocarbon radicals of 3 to 10 carbon atoms and the decadienyl radical, and Y is a substituent selected from the group consisting of an alkoxy group containing up to six carbon atoms, phenoxy, $NH_2$, morpholino, piperidino, N-butyl amino, anilino, and pyrrolidino, at a temperature of from about −30 to about 80° C. with at least one mol equivalent of a phosphorus or sulfur halide selected from the group consisting of phosphorus pentachloride, phosphorus trichloride, phosphorus pentabromide, phosphorus tribromide, and thionyl chloride.

3. The process of claim 2 wherein Y is selected from the group consisting of an alkoxy group containing up to six carbon atoms and phenoxy.

4. The process of claim 2 wherein Y is selected from the group consisting of $NH_2$, morpholino, piperidino, N-butyl amino, anilino, and pyrrolidino, at a temperature of from about −30 to about 80° C. with at least one mol equivalent of a phosphorus or sulfur halide selected from the group consisting of phosphorus pentachloride, phosphorus trichloride, phosphorus pentabromide, phosphorus tribromide, and thionyl chloride.

References Cited
UNITED STATES PATENTS
3,076,033   1/1963   Friedman _____ 260—465.1 X CHARLES B. PARKER, Primary Examiner D. H. TORRENCE, Assistant Examiner U.S. Cl. X.R.

260—78, 247.5, 294.7, 326.81, 326.85, 471, 465.1, 482, 566, 647, 666, 583